(12) United States Patent
Kojo

(10) Patent No.: US 7,664,628 B2
(45) Date of Patent: Feb. 16, 2010

(54) ELECTRONIC DICTIONARY WITH ILLUSTRATIVE SENTENCES

(75) Inventor: Takashi Kojo, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 979 days.

(21) Appl. No.: 11/139,137

(22) Filed: May 27, 2005

(65) Prior Publication Data

US 2005/0216255 A1    Sep. 29, 2005

Related U.S. Application Data

(63) Continuation of application No. PCT/JP03/17034, filed on Dec. 26, 2003.

(30) Foreign Application Priority Data

Dec. 27, 2002    (JP) ............................. 2002-381964

(51) Int. Cl.
*G06F 17/28* (2006.01)

(52) U.S. Cl. .................. 704/4; 704/8; 704/9; 704/10; 704/7

(58) Field of Classification Search .............. 704/1, 704/4, 8, 9, 10, 7
See application file for complete search history.

(56) References Cited

U.S. PATENT DOCUMENTS

| | | | | |
|---|---|---|---|---|
| 5,280,573 | A * | 1/1994 | Kuga et al. ................ | 715/708 |
| 5,289,376 | A * | 2/1994 | Yokogawa .................. | 704/10 |
| 5,373,442 | A * | 12/1994 | Kutsumi et al. .............. | 704/4 |
| 5,475,586 | A * | 12/1995 | Sata et al. .................. | 704/2 |
| 5,873,055 | A * | 2/1999 | Okunishi ..................... | 704/2 |
| 5,890,103 | A * | 3/1999 | Carus ......................... | 704/9 |
| 6,029,123 | A * | 2/2000 | Suda et al. .................. | 704/9 |
| 6,044,365 | A * | 3/2000 | Cannon et al. ............... | 707/2 |
| 6,047,299 | A * | 4/2000 | Kaijima ...................... | 715/236 |
| 6,128,635 | A * | 10/2000 | Ikeno .......................... | 715/246 |
| 6,393,389 | B1 * | 5/2002 | Chanod et al. ................ | 704/7 |
| 6,442,524 | B1 * | 8/2002 | Ecker et al. .................. | 704/277 |

(Continued)

FOREIGN PATENT DOCUMENTS

GB    2 364 146 A    1/2002

(Continued)

OTHER PUBLICATIONS

Canon IDF-3000 Electronic Dictionary. English Instruction Manual; Canon On-Line Mar. 2000; retrieved from Internet, pp. 6-14 (anonymous).

(Continued)

*Primary Examiner*—Vijay B Chawan
(74) *Attorney, Agent, or Firm*—Frishauf, Holtz, Goodman & Chick, P.C.

(57) ABSTRACT

When two or more retrieval words are entered through an entry unit of an information display control device, illustrative sentences containing all the retrieval words are extracted from an illustrative sentence data table and illustrative sentences corresponding to source entry words identical to the retrieval words are displayed in the order in which the retrieval words are entered and when a source entry word is selected, explanatory information of the meaning number identical to the source meaning number is displayed on a display unit, whereby the appropriate meaning of a word contained in an retrieved sentence is displayed.

8 Claims, 11 Drawing Sheets

U.S. PATENT DOCUMENTS

| | | | |
|---|---|---|---|
| 6,651,220 B1 * | 11/2003 | Penteroudakis et al. | 715/236 |
| 6,789,057 B1 * | 9/2004 | Morimoto et al. | 704/2 |
| 7,010,477 B1 * | 3/2006 | Iwahashi | 704/7 |
| 7,096,425 B1 * | 8/2006 | Takahashi | 715/222 |
| 7,403,889 B2 * | 7/2008 | Abe et al. | 704/7 |
| 2002/0019731 A1 * | 2/2002 | Masui et al. | 704/7 |

FOREIGN PATENT DOCUMENTS

| | | |
|---|---|---|
| JP | 7-114565 A | 5/1995 |
| JP | 8-235181 A | 9/1996 |
| JP | 2000-276485 A | 10/2000 |
| JP | 2001-134567 A | 5/2001 |
| JP | 2002-108857 A | 4/2002 |

OTHER PUBLICATIONS

Canon IDS-4100 Electronic Dictionary Instruction Manual Canon On=Line Nov. 2002, retrieved from Internet; pp. 6-7; 22-23; 40-42 (anonymous).

Japanese-English-Japanese Electronic Dictionaries; BORNPLAYDIE.COM; On-Line, Dec. 2004.

* cited by examiner

FIG.3

| ENTRY WORD | EXPLANATORY INFORMATION | ILLUSTRATIVE SENTENCE NUMBER |
|---|---|---|
| ⋮ | ⋮ | ⋮ |
| at | prep.) 1. ⋯ | 4, ⋯ |
|  | ⋮ | ⋮ |
|  | prep.) 14. ⋯の点で, ⋯において, ⋯ | 5, 6, 7, 8, ⋯ |
|  | ⋮ | ⋮ |
| ⋮ | ⋮ | ⋮ |
| good | adj.) 1. ⋯ | ⋯ |
|  | ⋮ | ⋮ |
|  | adj.) 10. [⋯に]熟達した, 巧みな, ⋯ | 100, ⋯ |
|  | ⋮ | ⋮ |
| ⋮ | ⋮ | ⋮ |

| ILLUSTRATIVE SENTENCE NUMBER | SOURCE | | ILLUSTRATIVE SENTENCE |
|---|---|---|---|
| | ENTRY WORD | MEANING | |
| 1 | anyway | adv. -1 | Anyway, it's been good talking to you. I'll call you again at the weekend.<br>(とにかくお話できてよかったです。週末にまたお電話します) |
| ⋮ | ⋮ | ⋮ | ⋮ |
| 4 | at | prep. -1 | ... |
| 5 | at | prep. -14 | be slow [quick] at learn<br>(覚えが遅い [速い]) |
| 6 | at | prep. -14 | be kind at heart<br>(根は親切だ) |
| 7 | at | prep. -14 | He is an expert at chess.<br>(彼はチェスの達人だ) |
| 8 | at | prep. -14 | She is good at golf.<br>(彼女はゴルフがうまい) |
| ⋮ | ⋮ | ⋮ | ⋮ |
| 100 | good | adj. -10 | She is good at swimming.<br>(彼女は泳ぎが上手だ) |
| 101 | good | adj. -10 | She got [became] good at English.<br>(彼女は英語が上達した) |
| 102 | good | adj. -10 | good at work in the world<br>(世の中で影響を及ぼす善[美徳]の力) |
| ⋮ | ⋮ | ⋮ | ⋮ |

| IDIOMATIC PHRASE | EXPLANATORY INFORMATION | ILLUSTRATIVE SENTENCE NUMBER |
|---|---|---|
| ⋮ | ⋮ | ⋮ |
| make a good [poor] fist at [of] O | …をうまく[へたに]やる… | … |
| ⋮ | ⋮ | ⋮ |

| WORD | ILLUSTRATIVE SENTENCE NUMBER |
|---|---|
| ⋮ | ⋮ |
| at | 1, 4, 5, 6, 7, 8, 100, 101, 102 … |
| good | 1, 8, 100, 101, 102 … |
| ⋮ | ⋮ |

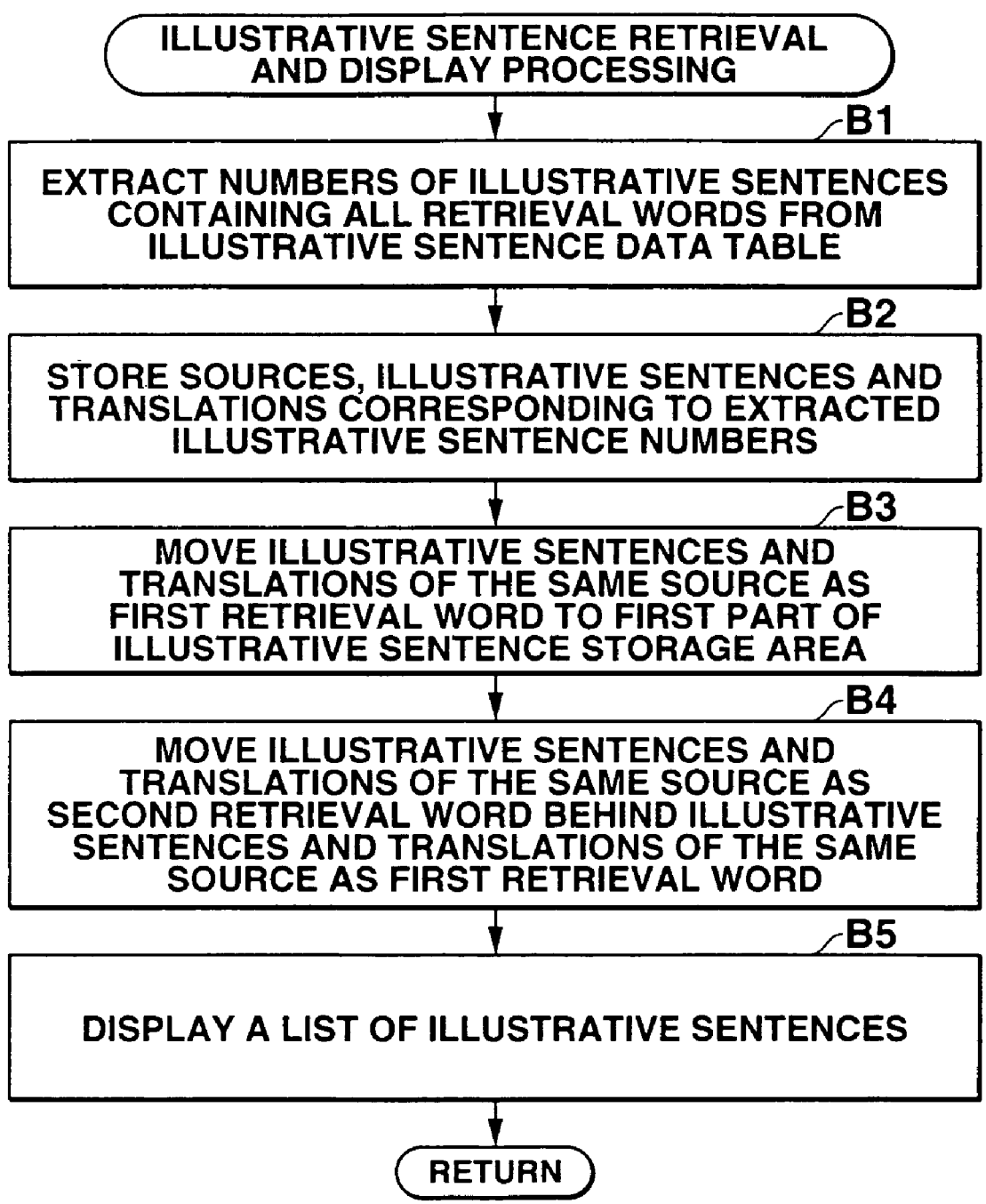

ELECTRONIC DICTIONARY WITH ILLUSTRATIVE SENTENCES

CROSS-REFERENCE TO RELATED APPLICATIONS

This is a Continuation Application of PCT Application No. PCT/JP03/17034, filed Dec. 26, 2003, which was published under PCT Article 21(2) in English.

This application is based upon and claims the benefit of priority from prior Japanese Patent Application No. 2002-381964, filed Dec. 27, 2002, the entire contents of which are incorporated herein by reference.

BACKGROUND OF THE INVENTION

1. Field of the Invention

The present invention relates to an information display control device and a program which are adapted to retrieve an illustrative sentence containing a specified retrieval word.

2. Description of the Related Art

An electronic dictionary is hitherto known which is a kind of information display control device and has a dictionary data base (DB). When a retrieval word is input, the electronic dictionary retrieves an entry word corresponding to the retrieval word from the dictionary DB and displays related information, such as the meaning of the retrieved entry word, illustrative sentences and idiomatic phrases using the entry word, pronunciation, explanation, etc. Also, an electronic dictionary is known which has a function of, when a word or a phrase contained in related information of a displayed entry word is specified, displaying information related to that word and phrase.

The electronic dictionary has a jump function. By using this function it becomes possible to specify a character string contained in explanatory information in, for example, a Japanese-language dictionary and display explanatory information of an entry word in the same Japanese-language dictionary or another dictionary, such as a Japanese-English dictionary or encyclopedia, using the character string as a retrieval word.

The jump function of the electronic dictionary is one which, when explanatory information corresponding to an entry word is being displayed, allows the user to specify a character string contained in the explanatory information and performs retrieval again using the specified character string as a retrieval word.

With the conventional electronic dictionaries, the following inconvenience is encountered in looking up the meaning of a word contained in an illustrative sentence displayed as the result of retrieval. That is, when the conventional jump function is performed on the word contained in the displayed illustrative sentence, explanatory information about the word is read from the dictionary DB and displayed from the beginning. For this reason, the user has to search the displayed explanatory information for the meaning of the word. This makes the electronic dictionaries difficult to handle.

In recent years, electronic dictionaries of the so-called full-content type have come into wide use which contain electronic versions of all paper-based dictionaries. With this type of dictionary, there is a large amount of explanatory information about one entry word and such explanatory information is displayed at a time. In order to search for desired explanatory information, therefore, it is required for the user to scroll through some pages. This is time-consuming.

BRIEF SUMMARY OF THE INVENTION

To solve the above problem, in the information display control device according to an aspect of the present invention, entry words are associated with their explanatory information for each of their meanings in entry word information storage means, illustrative sentences containing entry words stored in the entry word information storage means are associated with entry words and their meanings in illustrative sentence storage means, and, when a word as a retrieval word is input, illustrative sentences containing the input word are read from the illustrative sentence storage means and then displayed. Further, when one of the displayed illustrative sentences is specified, the entry word used in the specified illustrative sentence and its meaning are read from the illustrative sentence storage means, and the read entry word and explanatory information corresponding to its meaning are read from the entry word information storage means and then displayed.

Thus, after illustrative sentences containing a retrieval word have been displayed, a desired one of the illustrative sentences is specified, and the meaning of the entry word used in the specified illustrative sentence can be displayed. Even if the entry word bears a number of meanings, explanatory information corresponding to the meaning of the entry word used in the illustrative sentence is displayed immediately, allowing the user to confirm the meaning of the entry word used in the illustrative sentence with a single glance without scrolling.

BRIEF DESCRIPTION OF THE SEVERAL VIEWS OF THE DRAWING

FIG. 3 shows an example of a data structure of the entry word data table shown in FIG. 2;

FIG. 4 shows an example of a data structure of the illustrative sentence data table shown in FIG. 2;

FIG. 5A shows an example of a data structure of the idiomatic phrase data table shown in FIG. 2;

FIG. 5B shows an example of a data structure of the word/illustrative sentence data table shown in FIG. 2;

FIG. 7 is a flowchart illustrating the operation of the portable electronic dictionary for illustrative sentence retrieval and display processing;

DETAILED DESCRIPTION OF THE INVENTION

An embodiment of an information display control device according to the present invention will be described in detail hereinafter with reference to FIGS. 1 through 11. In the description which follows, the present invention will be described in terms of an application to a folding type of portable electronic dictionary which is one type of information display control device; however, this is by way of illustration only and not by way of limitation.

The portable electronic dictionary has various electronic dictionaries (dictionary DBs) built in, such as a Japanese-language dictionary, an English-Japanese dictionary, a Japanese-English dictionary, a thesaurus, a proverb dictionary, etc. In these dictionary DBs, each entry word is associated with character data for explaining it, image data, moving image data and audio data. The user is allowed to make a selection among the dictionaries, then enter a word and cause the explanation etc. for that word to be displayed. In what follows, the embodiment will be described taking a portable electronic dictionary having a built-in English-Japanese dictionary DB selected among a plurality of built-in dictionaries, by way of example.

Figure 1:
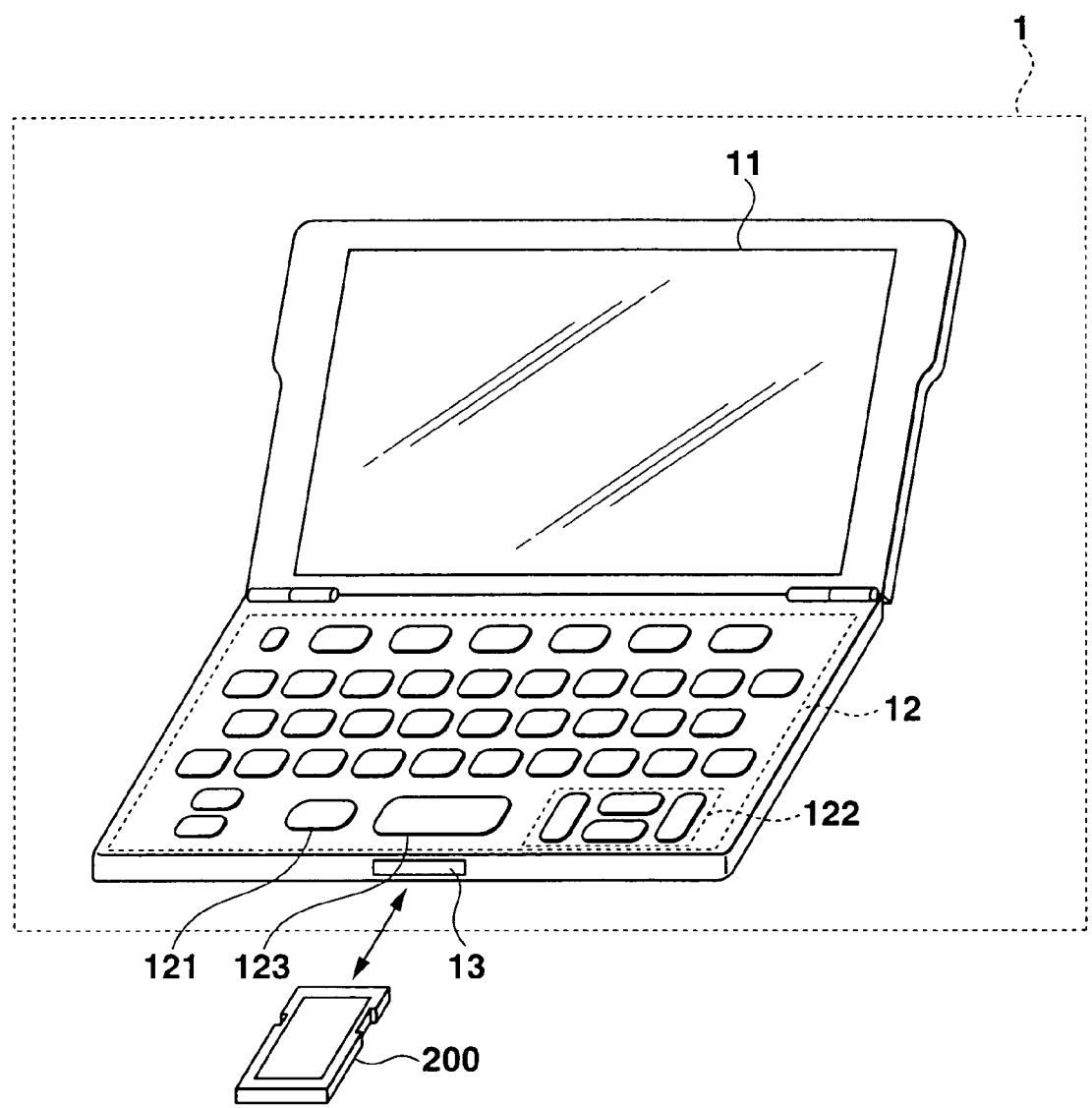
FIG. 1 is a perspective general view of a portable electronic dictionary according to one embodiment to which the present invention is applied.

FIG. 1 shows, in perspective, an example of a portable electronic dictionary. As shown, the portable electronic dictionary 1 includes a display screen 11, a group of keys 12, a built-in battery (not shown) and is housed in a casing made of metal or resin.

The display screen 11 is adapted to display various items of data, such characters, signs, etc., which correspond to depressed keys and are required to use the portable electronic dictionary. The display screen 11 comprises, for example, LCD (Liquid Crystal Display) devices or ELD (Electronic Luminescent Display) devices and is implemented by one or more devices.

Each of the keys in the key group 12 is allocated an inherent function. The user operates the portable electronic dictionary 1 by depressing the keys. Specifically, the keys include character entry keys, dictionary select keys, and an example display key that allows an example (quotation) for a specified word to be displayed.

Additionally, the key group 12 has a jump key 121, a direction key group 122, and a determination key 123. The direction key group 122 is comprised of four keys indicating up, down, right, and left. When the jump key 121 is depressed, the beginning word of words being displayed is selected. When one key of the direction key group 122 is depressed, another word is selected in accordance with the specified direction.

The direction key group 122 is used in selecting desired items on various setting screens, in scrolling through displayed information on the screen, etc. The determination key 123 is used in carrying out various modes, in determining selected items on the setting screens, etc.

The portable electronic dictionary 1 further includes a slot 13 into which a storage medium 200 is loaded. The storage medium 200 is adapted to store various dictionary data bases and programs and is comprised of, for example, a memory card or a hard disk. The slot 13 is a device which has the storage medium 200 removably mounted in it and allows the medium 200 to be read from and written into. The slot 13 may be configured suitably according to the type of the storage medium 200.

Figure 2:
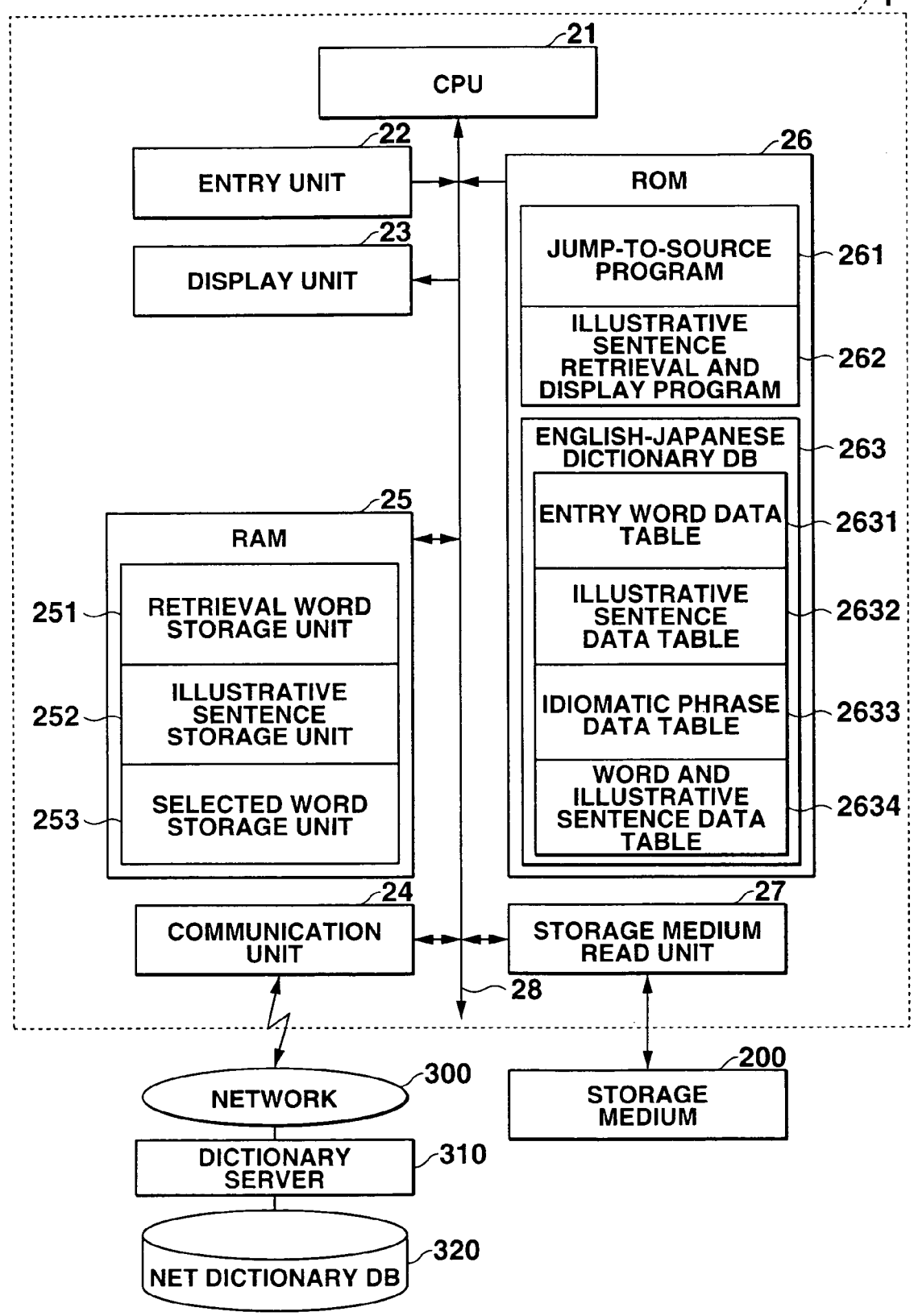
FIG. 2 is a block diagram of the portable electronic dictionary shown in FIG. 1.

FIG. 2 is a block diagram of the portable electronic dictionary 1. As shown, the portable electronic dictionary 1 is composed of a CPU 21, an entry unit 22 including the group of keys 12 of FIG. 1, a display unit 23 including the display screen 11, a communication unit 24, a RAM 25, a ROM 26, and a storage medium read unit 27, which are interconnected by a bus 28.

The CPU 21 executes program-based processing according to input commands, sends instructions to each of the functional units, makes data transfers, and exercises control over the portable electronic dictionary 1. Specifically, the CPU 21 reads a program from the ROM 26 in response to a key depression signal from the input unit 22, then carries out processing in accordance with that program, stores the results of the processing into the RAM 25, outputs a display signal for displaying the processing results to the display unit 23, and causes it to display the resulting information.

In addition, the CPU 21 reads a jump-to-source program 261 to be described later and then carries out a jump-to-source process. Thereby, an illustrative sentence that contains all input words is retrieved and displayed and the meaning of a selected word in the displayed illustrative sentence is displayed.

Specifically, the CPU 21 displays a data entry panel on the display unit 23 to allow the user to enter a retrieval word. When the user enters a retrieval word composed of a plurality of words, the CPU retrieves an illustrative sentence that contains that retrieval word from an English-Japanese dictionary DB 263 and displays it on the display unit 23. Further, when the user selects a word from the illustrative sentence and then performs a given operation, the CPU displays the meaning of the selected word on the display unit 23.

The entry unit 22 is an input device which is equipped with a set of keys necessary for entry of characters, such as kana characters, alphabetic characters, etc., and function selection. When a key is depressed, a key depression signal is output to the CPU 21. In particular, the entry unit implements entry means for entry of a retrieval word, an instruction to select from dictionaries, an instruction to execute retrieval, and instruction to switch modes. The entry unit 22 corresponds to the key set 12 shown in FIG. 1.

The display unit 23 causes various screens to appear on the basis of display signals input from the CPU 21. This display unit corresponds to the display screen 11 shown in FIG. 1.

The communication unit 24 is comprised of communication equipment for sending or receiving predetermined information to or from some other device (for example, a dictionary server 310) over a network 300. This network is comprised of a network, such as a LAN, a WAN, Internet, etc. The CPU 21 performs control for communication with external equipment over the communication unit 24 and a communication line, such as a telephone line, ISDN line, radio communication line, dedicated line, CATV line, etc.

Note that the electronic dictionary and external equipment may be directly linked through cable or radio communication without being linked through the network 300.

The dictionary server 310 makes a net dictionary DB 320 managed by it open to the public so that dictionary data stored in that dictionary DB can be retrieved and displayed. Specifically, the dictionary server 310, upon receipt of a request for retrieval of dictionary data sent from the portable electronic dictionary 1, retrieves user-specified entry word data from the net dictionary DB 320 and sends explanatory information for the entry word data to the portable electronic dictionary 1. The net dictionary DB 320 is updated as required by addition of new words by way of example. When the dictionary data is updated, the date of updating is also updated.

The RAM 25 has memory areas that temporarily store various programs that the CPU 21 executes and data associated with execution of these programs. In the present embodiment, in particular, a retrieval word storage area 251, an illustrative sentence storage area 252 and a selected word storage area 253 are prepared.

The retrieval word storage area 251 stores words entered through the entry unit 22. Hereinafter, of entered words, each word is referred to as a single retrieval word and a collection of two or more words is referred to as a plural retrieval word.

A mere retrieval word refers to a word or words entered by the user for retrieval, which may consist of either a single word or two or more words (i.e., the single retrieval word and the plural retrieval word).

The illustrative sentence storage area 252 stores illustrative sentences, sources, and translations which were extracted as the result of execution of the jump-to-source processing by the CPU 21.

The ROM 26 stores programs and data for implementing various functions of the portable electronic dictionary 1. In the present embodiment, a jump-to-source program 261, an illustrative sentence retrieval and display program 262 and an English-Japanese dictionary DB 263 are stored in the ROM 26.

The jump-to-source program 261 is one which causes the CPU 21 to execute a jump-to-source process of retrieving an illustrative sentence that contains a retrieval word entered by the user from the English-Japanese dictionary DB 263, displaying it on the display unit 23 and, when a word in the illustrative sentence is selected, and displaying the meaning of that word.

The illustrative sentence retrieval and display program 262, which is a subroutine program contained in the jump-to-source program 261, causes the CPU 21 to execute an illustrative sentence retrieval and display process of retrieving an illustrative sentence that contains an input retrieval word from the English-Japanese dictionary DB 263 and displaying it.

The English-Japanese dictionary DB 263 contains an entry word data table 2631, an illustrative sentence data table 2632, an idiomatic phrase data table 2633, and a word and illustrative sentence data table 2634.

FIG. 3 shows an exemplary data structure of the entry word data table 2631. In the entry word data table 2631 are stored entry words (for example, "at") and explanatory information indicating the meanings thereof in Japanese (for example, prep 14. . . . の点で., . . . において., . . . ). The explanatory information is stored for each of the meanings of the corresponding word such as "at" or "good". Further, illustrative sentence numbers for specifying related illustrative sentences are associated with each meaning. The illustrative sentence numbers are ones which identify illustrative sentences stored in the illustrative sentence data table 2632.

FIG. 4 shows an exemplary data structure of the illustrative sentence data table 2632. In this table, illustrative sentence numbers, sources of illustrative sentences and illustrative sentences are associated with one another. A translation of the illustrative sentences is stored together with each illustrative sentence. The source indicates an entry word to which the corresponding illustrative sentence is related and its meaning. For example, "be slow [quick] at learn", which is the illustrative sentence number 5, indicates an illustrative sentence related to the preposition 14-th (prep.-14) meaning of entry word "at".

In the description which follows, the entry word and the meaning contained in the source field of the illustrative sentence data table 2632 are referred to as "source entry word" and "source meaning", respectively.

FIG. 5A shows an exemplary data structure of the idiomatic phrase data table 2633. In this table 2633, idiomatic phrases (for example, "make a good [poor] fist at [of] ~") are mapped to explanatory information indicating the meanings thereof (for example, " . . . をうまく「へたに」やる").

FIG. 5B shows an exemplary data structure of the word and illustrative sentence data table 2634. In this table, words are mapped to numbers of illustrative sentences each containing a corresponding one of the words.

The storage medium read unit 27 is a function unit that reads from or writes onto the recording medium 200, such as a memory card or a hard disk. This storage medium read unit corresponds to the slot 13 shown in FIG. 1.

The CPU 21 is allowed to retrieve illustrative sentences containing a retrieval word from a dictionary DB (in this embodiment, the English-Japanese dictionary DB 263) stored in the ROM 26, dictionary DBs stored on the storage medium 200, and the net dictionary DB 320. In this case, the dictionary DBs stored on the storage medium 200 and the net dictionary DB 320 have the same data structure as the English-Japanese dictionary DB 263. The present embodiment will be described in terms of retrieval of illustrative sentences using the English-Japanese dictionary DB 263.

Figure 6:
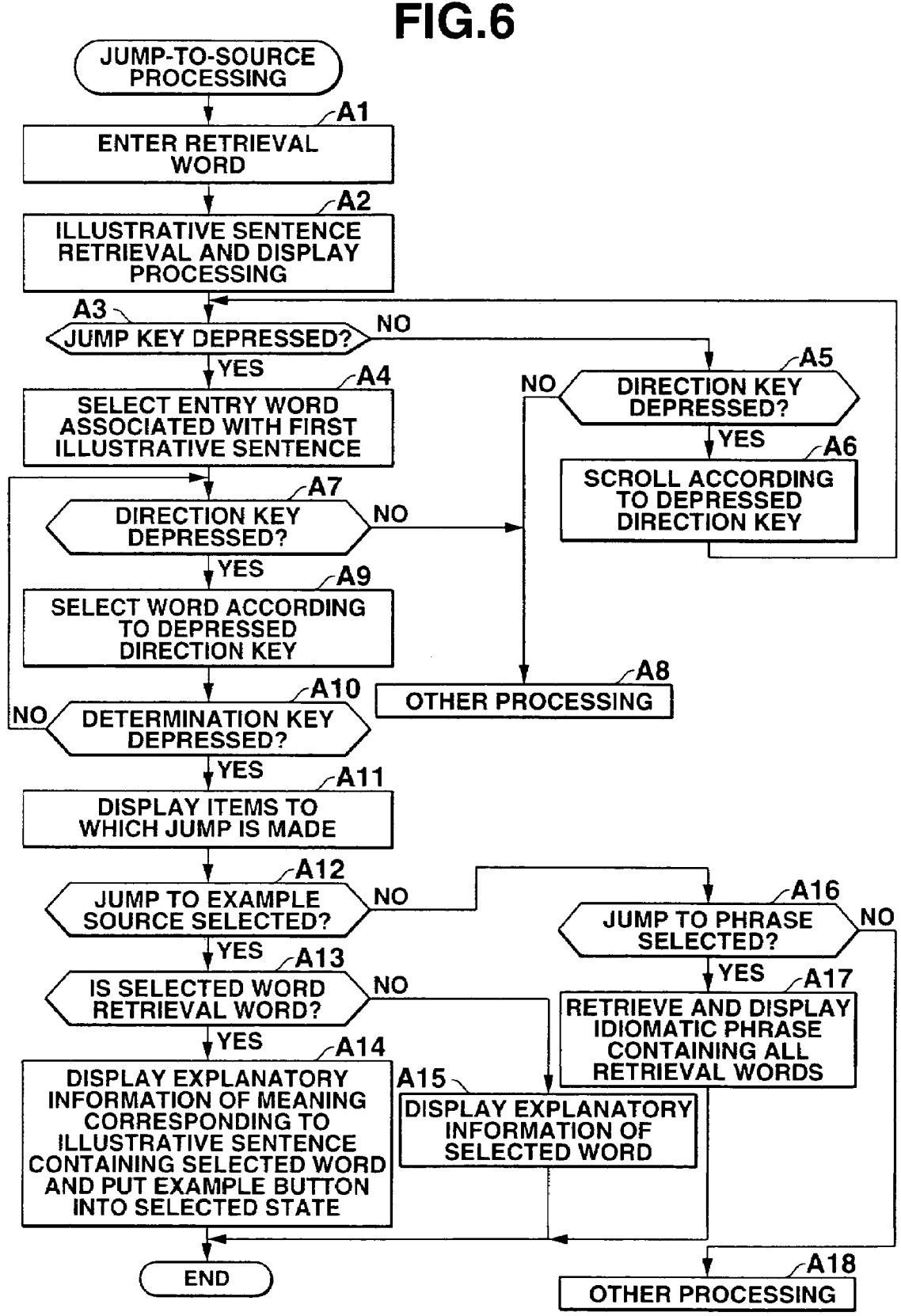
FIG. 6 is a flowchart illustrating the operation of the portable electronic dictionary for jump-to-source processing.

FIG. 6 is a flowchart illustrating a jump-to-source processing operation executed by the CPU 21 in accordance with the jump-to-source program 261. FIG. 7 is a flowchart illustrating an illustrative sentence retrieval and display processing operation which is a subroutine of the jump-to-source program 261. The flow of the jump-to-source processing will be described with reference to FIGS. 6 and 7.

Figure 8A:
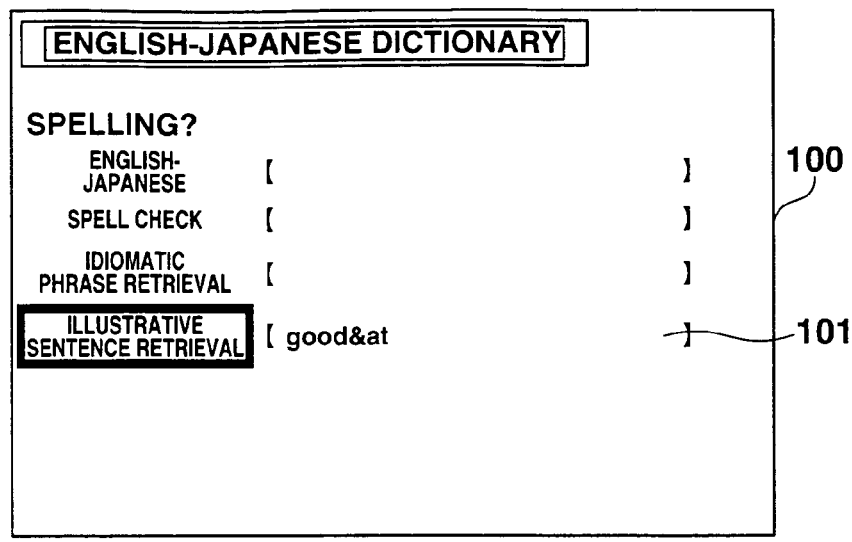
FIGS. 8A, 8B and 8C show exemplary display screens which appear on the display unit shown in FIG. 2.

First, the CPU 21 displays such a retrieval word entry panel 100 as shown in FIG. 8A on the display unit 23. When a retrieval word is entered by the user (step A1), the CPU 21 displays characters in a character display area 101 on the panel 100 on the basis of key depression signals corresponding to depressed keys and then stores the entered retrieval words in the retrieval word storage area 251 in the RAM 25.

Suppose here that the user wants to retrieve illustrative sentences that contain words of, for example, "good" and "at". Then, the user enters the words in the form of "good & at". "&" may be replaced with another specific symbol. In the retrieval word storage area 251, the retrieval words are stored, like "good, at", in the order in which they were entered.

Next, the CPU 21 switches the procedure to the illustrative sentence retrieval and display process (step A2). FIG. 7 is a flowchart illustrating the illustrative sentence retrieval and display processing operation carried out by the CPU 21 in accordance with the illustrative sentence retrieval and display program 262. First, the CPU 21 extracts the illustrative sentence numbers of illustrative sentences that contain all the retrieval words stored in the retrieval word storage area 251 from the illustrative sentence data table 2634 shown in FIG. 5B (step B1).

Specifically, when retrieval words are stored in the form of "good, at" in the retrieval word storage area 251, the CPU 21 first extracts illustrative sentence numbers (1, 8, 100, 101, 102, . . . ) corresponding to "good" from the word and illustrative data table 2634 and then extracts illustrative sentence numbers (1, 4, 5, 6, 7, 8, 100, 101, 102, . . . ) corresponding to "at". The CPU 21 next extracts a common illustrative sentence number or numbers from the illustrative sentence numbers extracted for each word.

Figure 10A:
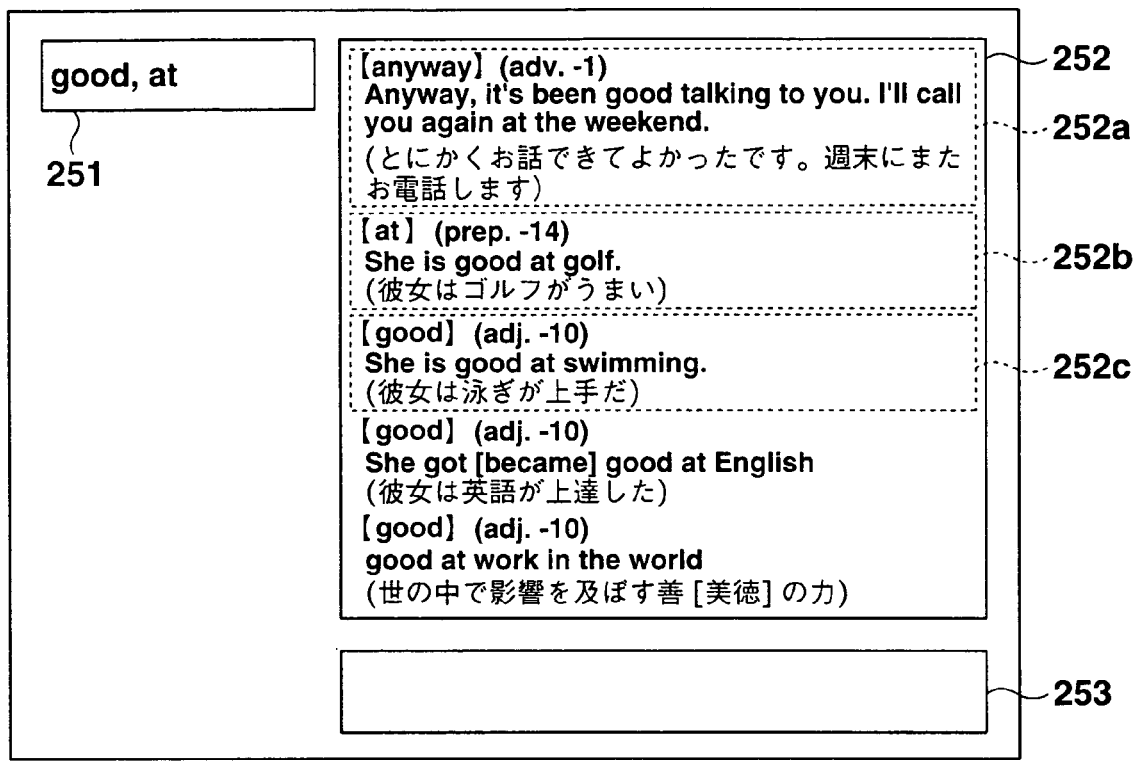
FIGS. 10A and 10B show exemplary stored contents of the retrieval word storage area, the illustrative sentence storage area and the selected word storage area shown in FIG. 2.

Next, the CPU 21 refers to the illustrative sentence data table 2632 shown in FIG. 4 to store illustrative sentences, sources and translations corresponding to the illustrative sentences extracted in step B1 in the illustrative sentence storage area 252 in the RAM 25 (step B2). FIG. 10A shows exemplary stored contents of the retrieval word storage area 251, the illustrative sentence storage area 252 and the selected word storage area 253 in the RAM at the termination of the process in step B2 in the illustrative sentence retrieval and display processing in the case where entry was made in the form of "good & at" at the entry unit 22. The retrieval word storage area 251 is stored with "good, at" according to the entered retrieval words. The illustrative sentence storage area 252 is stored with illustrative sentences containing both "good" and "at" and corresponding sources and translations.

The CPU 21 retrieves from the illustrative sentences stored in the illustrative sentence storage area 252 illustrative sentences the source entry words of which are identical to the first retrieval word stored in the retrieval word storage area 251, then moves the retrieved illustrative sentences and the corresponding sources and translations to the beginning part of the illustrative sentence storage area 252 and stores them there (step B3).

Specifically, since the stored contents of the retrieval word storage area 251 are "good, at" as shown in FIG. 10A, the illustrative sentence 252c the source entry word of which is "good" is moved to the first part of the illustrative sentence storage area 252 and stored. The other illustrative sentences the source entry words of which are "good" and the corresponding sources and translations are likewise moved in sequence to the first part of the illustrative storage area 252 and stored.

Subsequently, the CPU 21 retrieves from the illustrative sentences stored in the illustrative sentence storage area 252 illustrative sentences the source entry words of which are identical to the second retrieval word stored in the retrieval word storage area 251 and then moves these illustrative sentences and corresponding sources and translations to the part behind the illustrative sentences the source entry words of which are identical to the first retrieval word, sources and translations for storage (step B4).

Specifically, since the stored contents of the retrieval word storage area 251 are "good, at" as shown in FIG. 10A, the illustrative sentence 252b the source entry word of which is "at" is moved to follow behind the illustrative sentences whose source entry words are "good" and the corresponding sources and translations and then stored.

Figure 10B:
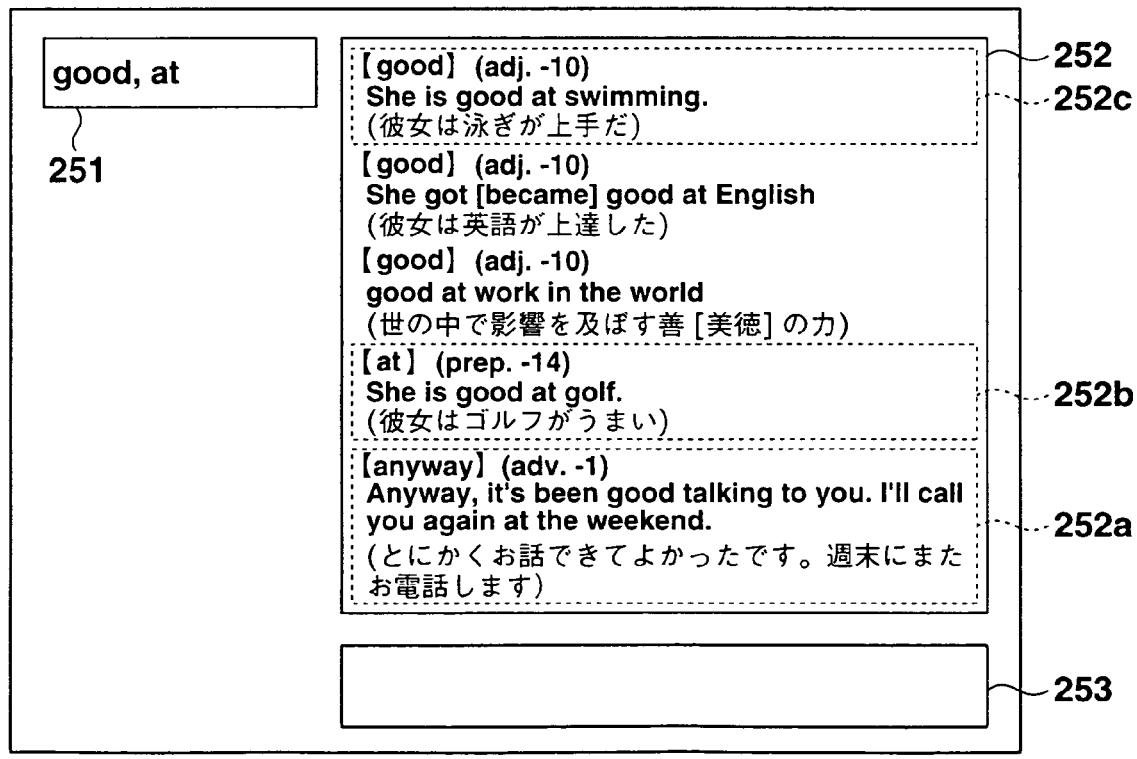

FIG. 10B shows exemplary stored contents of the retrieval word storage area 251, the illustrative sentence storage area 252 and the selected word storage area 253 at the termination of the process in step B4 in the illustrative sentence retrieval and display processing. Since the stored contents of the retrieval word storage area 251 are "good, at", the illustrative sentences the source entry words of which are "good", such as the illustrative sentence 252c, etc., are stored in the first part of the illustrative sentence storage area 252. The illustrative sentence 252b the source entry word of which is "at" is stored behind the illustrative sentences the source entry words of which are "good", such as the illustrative sentence 252c, etc., and the corresponding sources and translations. Furthermore, the illustrative sentence 252a the source entry word of which is neither "good" nor "at" is stored behind the illustrative sentences the source entry words of which are either "good" or "at" and the corresponding sources and translations.

When three or more retrieval words are stored in the retrieval word storage area 251, the CPU 21 repeats rearranging and storing of illustrative sentences and corresponding sources and translations stored in the illustrative sentence storage area 252 in accordance with the order in which the retrieval words were entered.

Figure 8B:
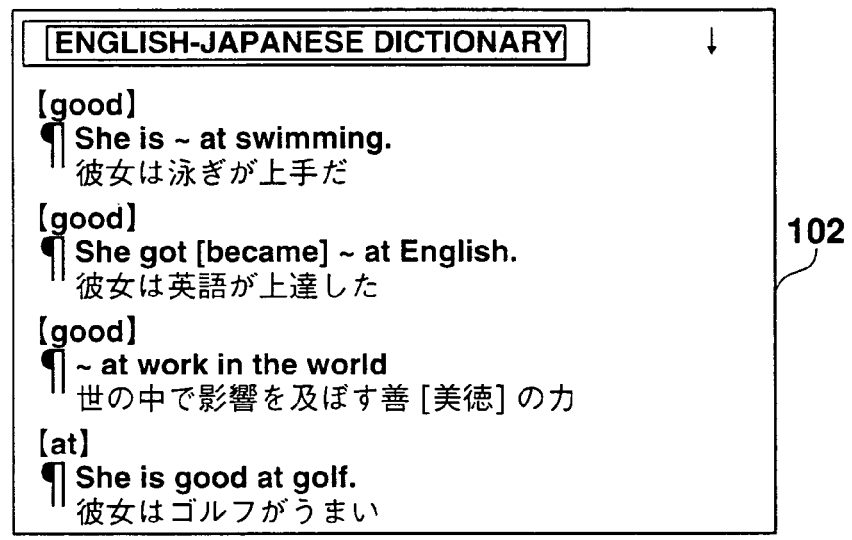

Next, the CPU 21 displays a list of illustrative sentences on the display unit 23 on the basis of the stored contents of the illustrative sentence storage area 252 (step B5). FIG. 8B shows an exemplary display screen 102 which appears in step B5.

The CPU 21 next goes from the illustrative sentence retrieval and display processing to step A3 in the jump-to-source processing. The CPU 21 makes a decision of whether or not the jump key is depressed (step A3). If the decision is that the jump key 121 is not depressed (NO in step A3), then the CPU 21 makes a decision of whether or not any of the direction keys 122 is depressed (step A5). If the decision is that one of the direction keys 122 is depressed (YES in step A5), then the CPU 21 scrolls the display screen of the display unit 23 in accordance with the direction specified by the key in the direction key group 122 (step A6).

If, on the other hand, the decision is that the direction key group 122 is not depressed (NO in step A5), then the CPU 21 goes to other processing (step S8). If the decision in step A3 is that the jump key 121 is depressed, the CPU 21 selects the entry word associated with the first illustrative sentence from the words displayed on the display unit 23 and then stores it in the selected word storage area 253 (step A4). The selected entry word is reversed in order to indicate that it is in the selected state.

Subsequently, the CPU 21 makes a decision of whether or not any of the direction keys 122 is depressed (step A7). If the decision is that the direction key is not depressed (NO in step A7), the CPU 21 goes to other processing (step A8). If, on the other hand, the decision is that the direction key is depressed (YES in step A7), then the CPU 21 selects another word in accordance with the direction specified by the direction key in the direction keys 122, then updates the selected word storage area 253 and stores the newly selected word in it (step A9).

The CPU 21 next makes a decision of whether or not the determination key 123 is depressed (step A10). If the decision is that the determination key 123 is not depressed (NO in step A10), the CPU 21 returns to step A7.

Figure 8C:
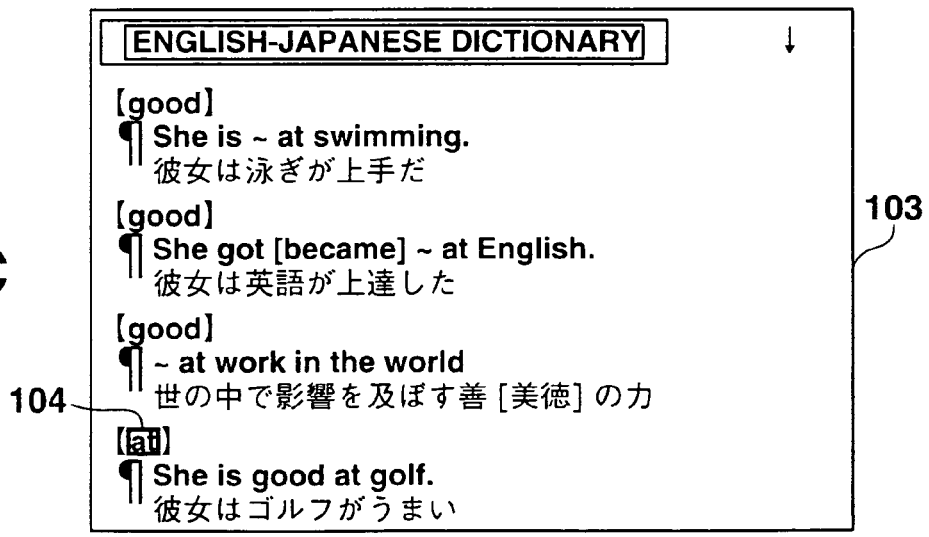

FIG. 8C shows an exemplary display screen 103 which appears when the jump key 121 is depressed in step A3 and the direction key 122 is then depressed repeatedly so that the word 104 is selected. The word 104 is reversed in order to indicate that it is in the selected state.

Figure 11:
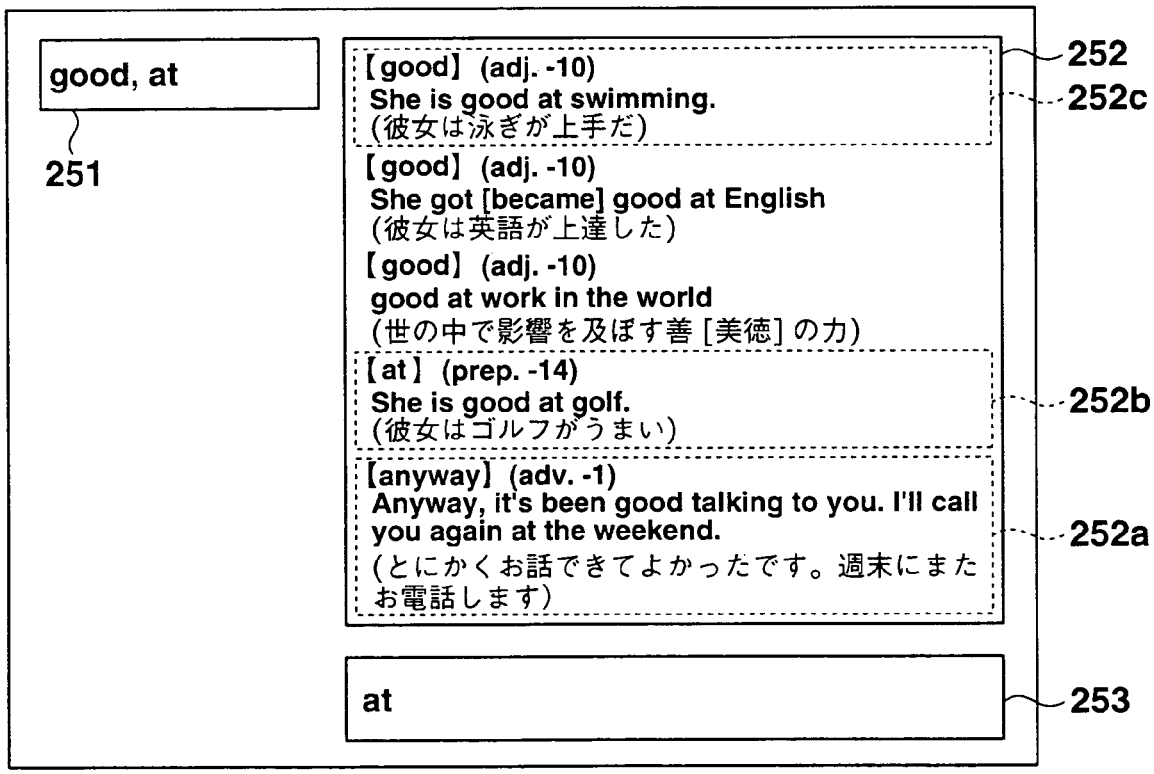
FIG. 11 shows exemplary stored contents of the retrieval word storage area, the illustrative sentence storage area and the selected word storage area.

FIG. 11 shows exemplary stored contents of the retrieval word storage area 251, the illustrative sentence storage area 252 and the selected word storage area 253 when the jump key 121 is depressed in step A3 and the desired one of the direction key 122 is then depressed repeatedly so that the word 104 is selected. In the selected word storage area 253 is stored the word, "at", which is in the selected state.

If, on the other hand, the decision in step A10 is that the determination key 123 has been depressed (Yes in step A11), then the CPU 21 displays items to which a jump can be made in a window on the display unit 23 (step A11).

Figure 9A:
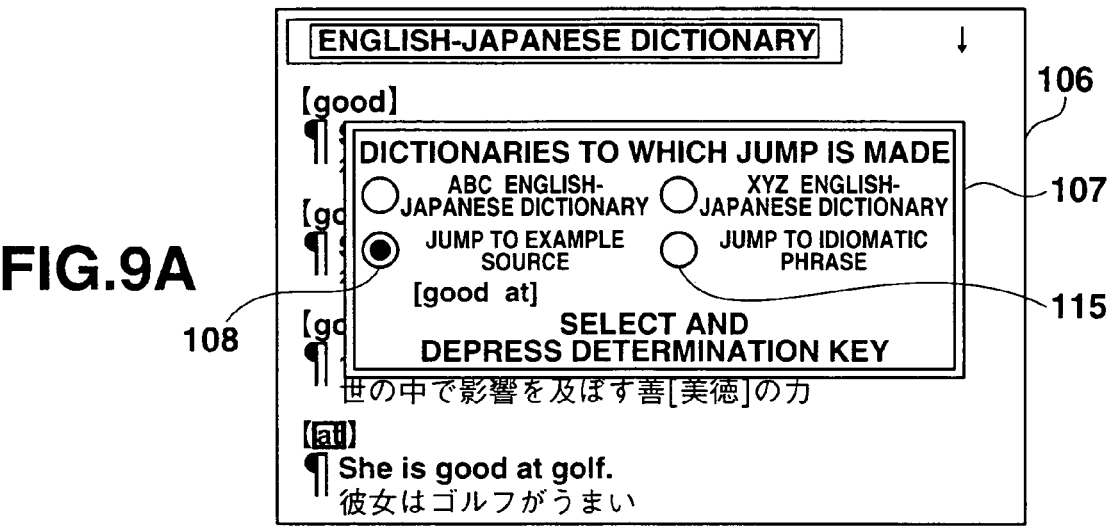
FIGS. 9A, 9B and 9C show exemplary display screens which appear on the display unit.

FIG. 9A shows an exemplary display screen 106 which appears when the determination key 123 is depressed in step A10. In a window 107 are displayed items to which a jump can be made. In determining an item to which a jump is to be made, the user selects the radio button corresponding to that item and then depresses the determination key 123.

The CPU 21 makes a decision of whether the radio button 108 corresponding to the jump to example source has been selected and the determination key 123 has been depressed (step A12). If the decision is that the radio button 108 has been selected and the determination key 123 has been depressed (Yes in step A12), the CPU 21 makes a decision of whether or not the word stored in the selected word storage area 253 is identical to one of the retrieval words stored in the retrieval word storage area 251 (step A13).

If the decision is that the word stored in the selected word storage area 253 is identical to one of the retrieval words stored in the retrieval word storage area 251 (Yes in step A13), then the CPU 21 extracts the source entry word and the source meanings associated with illustrative sentences containing the selected word from the illustrative sentence data table 2632 shown in FIG. 4. The CPU 21 then reads from the entry word data table 2631 shown in FIG. 3 explanatory information corresponding to the extracted source meanings in explanatory information corresponding to the extracted source entry word and displays it on the display unit 23 (step A14). In addition, the CPU 21 puts the example (quotation) button corresponding to that meaning into the selected state.

Figure 9B:
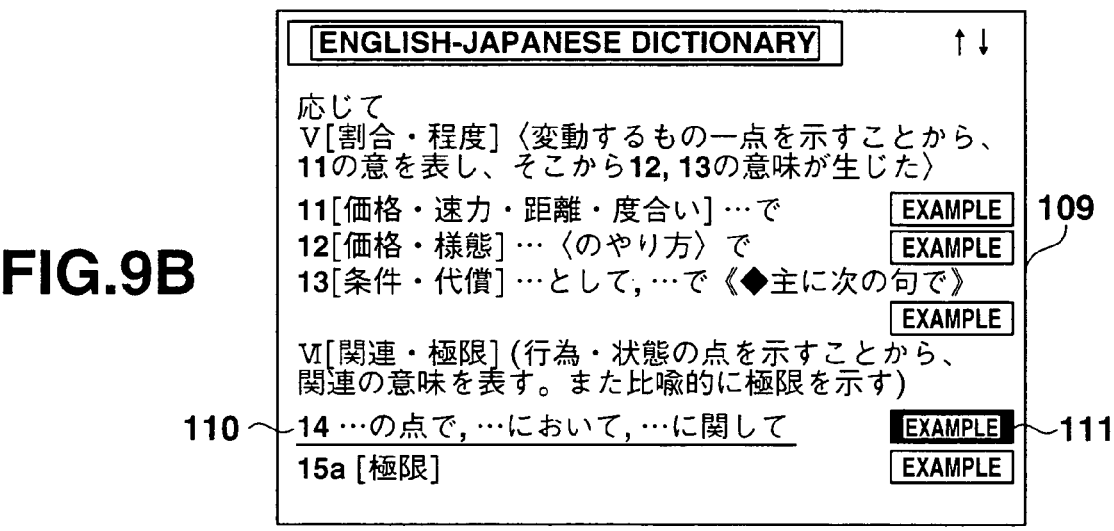

FIG. 9B shows an exemplary display screen 109 which appears in step A14. For example, the explanatory information 110 for the meaning corresponding to the selected word is underlined, for example, for easier viewing. Alternatively, the explanatory information 110 may be reversed or changed in font or color. The example button 111 corresponding to the explanatory information 110 is automatically placed in the selected state.

If, on the other hand, the decision in step A13 is that the word stored in the selected word storage area 253 differs from any of the retrieval words stored in the retrieval word storage area 251 (step A13), then the CPU 21 uses the word stored in the selected word storage area 253 as an entry word to read explanatory information for that entry word from the entry word data table 2631 and display it on the display unit (step A15).

If the decision in step A12 is that the jump to example source is not selected, then the CPU 21 makes a decision of whether or not the radio button 115 for jump to idiomatic phrase has been selected (step A16). If the radio button 115 is not selected (No in step A16), then the CPU 21 goes to other processing (step A18).

If the radio button 115 for jump to phrase has been selected (Yes in step A16), then the CPU 21 extracts an idiomatic phrase or phrases containing all the retrieval words stored in the retrieval word storage area 251 and associated explanatory information from the idiomatic phrase data table 2633 shown in FIG. 5 and displays them on the display unit 23 (step A17). For example, if "good" and "at" are stored in the retrieval word storage area 251, an idiomatic phrase, "make a good [poor] fist at [of] ~", that contains both "good" and "at" is retrieved from the phrase data table 2633 and displayed together with explanatory information. The user therefore don't have to perform such idiomatic phrase retrieval as involves reentry of a retrieval word on the data entry panel, allowing idiomatic phrase retrieval to be carried out immediately. Then, the jump-to-source processing is complete.

Figure 9C:
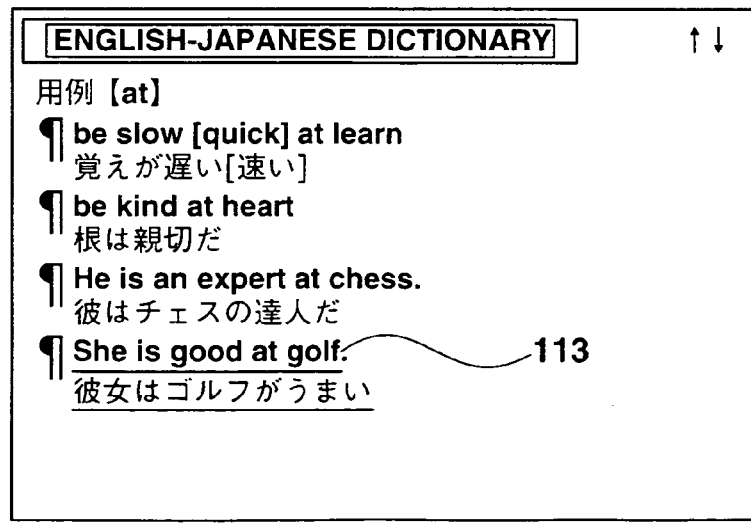

FIG. 9C shows an exemplary display screen 112 which appears after the determination key 123 is depressed when the example button 111 is in the selected state on the display screen 109 shown in FIG. 9B. A list of examples for the meaning number "14" of the entry word "at" is displayed on the display screen 112. Further, an example that contains all the retrieval words stored in the retrieval word storage area 251 is displayed in a special way. For example, if "good" and "at" are stored in the retrieval word storage area 251, the example 113 is displayed underlined.

As described above, in retrieving an illustrative sentence on the basis of an entered retrieval word, selecting a word contained in the retrieved illustrative sentence, and displaying the meaning of that word, when the word is identical to the source entry word for the illustrative sentence, explanatory information of the corresponding source meaning is displayed on the display unit 23. Thus, even if the selected word bears a number of meanings, the user is allowed to confirm the desired meaning with a single glance without scrolling.

Moreover, by rearranging retrieved illustrative sentences the source entry words of which are retrieval words in accordance with the order in which the retrieval words are entered and displaying the rearranged illustrative sentences, the user is allowed to confirm a desired illustrative sentence immediately without scrolling.

Furthermore, by displaying an example containing all the retrieval words in a special way in listing explanatory information of sources corresponding to illustrative sentences and examples of the explanatory information, the user is allowed to recognize immediately the display of the meaning of a selected word.

Although the preferred embodiment of the present invention has been disclosed and described, it is apparent that the present invention may be practiced or embodied in still other ways without departing from the scope and spirit thereof.

Although the invention has been described in terms of one specific application to an electronic dictionary, the principles of the invention are equally applicable to electronic equipment in general, such as a mobile phone, personal computer, electronic watch, etc. Electronic dictionary data may be stored on a medium, such as a memory card, a CD, or the like, that can be removably attached to the electronic dictionary body.

Although the embodiment has been described as connecting the electronic dictionary 1 to the dictionary server 310 through the network 300 and downloading entry words from the net dictionary DB 320 to the dictionary, this is not restrictive. For example, entry words may be downloaded from a dictionary DB stored on a CD-ROM which is removably attached to a personal computer connected by a cable to the dictionary.

What is claimed is:

1. An information display control device comprising:
  entry word information storage means for storing entry words in association with explanatory information for each of their meanings;
  illustrative sentence storage means for storing illustrative sentences, that use the entry words stored in the entry word information storage means, in association with the entry words and their meanings;
  illustrative sentence display control means for displaying stored illustrative sentences and corresponding entry words stored in association with the illustrative sentences;
  word selecting means for selecting a word in accordance with a user operation, the word being selected from either one of the displayed illustrative sentences or one of the displayed entry words; and
  explanatory information display control means which, if the selected word is one of the displayed entry words, is configured for displaying the explanatory information for the meaning stored in association with the illustrative sentence to which the selected word corresponds, and which, if the selected word is not one of the displayed entry words, is configured for displaying the explanatory information of a retrieved entry word, wherein the retrieved entry word is retrieved from the entry word information storage means by using the selected word as a new retrieval word.

2. The information display control device according to claim 1, wherein the explanatory information display control means is, when the selected word is one of the displayed entry words, configured for displaying the explanatory information of the one of the displayed entry words, stored in association with the corresponding illustrative sentence, read from the entry word information storage means, and for highlighting the displayed explanatory information for a given meaning of the one of the displayed entry words.

3. The information display control device according to claim 1, further comprising:

entering means for entering a number of words serving as retrieval words in accordance with the user operation; and retrieval means for retrieving at least one illustrative sentence including all the words entered by the entering means, wherein the illustrative sentence display control means is configured for displaying at first, a first retrieved illustrative sentence prior to a second retrieved illustrative sentence, if an entry word stored in the illustrative sentence storage means in association with the first retrieved illustrative sentence is identical to one of the entered words and, if no entry word stored in the illustrative sentence storage means in association with the second retrieved illustrative sentence is identical to one of the entered words.

4. An information display control device comprising:

an entry word information storage unit configured to store entry words in association with explanatory information for each of their meanings;

an illustrative sentence storage unit configured to store illustrative sentences, that use the entry words stored in the entry word information storage unit, in association with the entry words and their meanings;

an illustrative sentence display control unit configured to display stored illustrative sentences and corresponding entry words stored in association with the illustrative sentences;

a word selecting unit configured to select a word in accordance with a user operation, the word being selected from either one of the displayed illustrative sentences or one of the displayed entry words; and an explanatory information display control unit configured to, if the selected word is one of the displayed entry words, display the explanatory information for the meaning stored in association with the illustrative sentence to which the selected word corresponds, and configured to, if the selected word is not one of the displayed entry words, display the explanatory information of a retrieved entry word, wherein the retrieved entry word is retrieved from the entry word information storage unit by using the selected word as a new retrieval word.

5. The information display control device according to claim 4, wherein the explanatory information display control unit is configured to, when the selected word is one of the displayed entry words, display the explanatory information of the one of the displayed entry words, stored in association with the corresponding illustrative sentence, read from the entry word information storage unit, and highlight the displayed explanatory information for a given meaning of the one of the displayed entry words.

6. The information display control device according to claim 4, further comprising:

an entering unit configured to enter a number of words serving as retrieval words in accordance with the user operation; and a retrieval unit configured to retrieve illustrative sentences including all the words entered by the entering unit, wherein the illustrative sentence display control unit is configured to display at first, a first retrieved illustrative sentence prior to a second retrieved illustrative sentence, if an entry word stored in the illustrative sentence storage unit in association with the first retrieved illustrative sentence is identical to one of the entered words, and if no entry word stored in the illustrative sentence storage unit in association with the second retrieved illustrative sentence is identical with one of the entered words.

7. A computer-readable recording medium having stored thereon a program for an information display control device, the program being executable by a computer of the information display control device to perform functions comprising:

storing entry words in association with explanatory information for each of their meanings;

storing illustrative sentences using the entry words in association with the entry words and their meanings;

displaying stored illustrative sentences and corresponding entry words stored in association with the illustrative sentences;

selecting a word in accordance with a user operation, the word being selected from either one of the displayed illustrative sentences or one of the displayed entry words; and if the selected word is one of the displayed entry words, displaying the explanatory information for the meaning stored in association with the illustrative sentence to which the selected word corresponds, and if the selected word is not one of the displayed entry words, displaying the explanatory information of a retrieved entry word, wherein the retrieved entry word is retrieved from the stored entry words by using the selected word as a new retrieval word.

8. A retrieval/display method of an information display control device that comprises a dictionary in which entry words are associated with explanatory information for each of their meanings, and an illustrative sentence data table in which illustrative sentences containing the entry words stored in the dictionary are associated with the entry words and their meanings, the method comprising:

storing the entry words in association with the explanatory information for each of their meanings;

storing the illustrative sentences using the entry words in association with the entry words and their meanings;

displaying stored illustrative sentences and corresponding entry words stored in association with the illustrative sentences;

selecting a word in accordance with a user operation, the word being selected from either one of the displayed illustrative sentences or one of the displayed entry words; and if the selected word is one of the displayed entry words, displaying the explanatory information for the meaning stored in association with the illustrative sentence to which the selected word corresponds, and if the selected word is not one of the displayed entry words, displaying the explanatory information of a retrieved entry word, wherein the retrieved entry word is retrieved from the stored entry words by using the selected word as a new retrieval word.

* * * * *